United States Patent
Chen

(12) United States Patent    (10) Patent No.: US 7,678,347 B2
Chen    (45) Date of Patent: Mar. 16, 2010

(54) HIGH PHOSPHOROUS POISONING RESISTANT CATALYSTS FOR TREATING AUTOMOBILE EXHAUST

(75) Inventor: Shau-Lin Franklin Chen, Piscataway, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 416 days.

(21) Appl. No.: 11/182,462

(22) Filed: Jul. 15, 2005

(65) Prior Publication Data

US 2007/0014705 A1    Jan. 18, 2007

(51) Int. Cl.
*B01D 50/00* (2006.01)
*B01D 53/34* (2006.01)

(52) U.S. Cl. ........................ 422/180; 422/168; 422/177

(58) Field of Classification Search ................ 422/168, 422/177, 180
See application file for complete search history.

(56) References Cited

U.S. PATENT DOCUMENTS

| | | | |
|---|---|---|---|
| 4,134,733 A | 1/1979 | Volker et al. ................ 422/177 |
| 4,587,231 A | 5/1986 | Sawamura et al. | |
| 4,708,946 A | 11/1987 | Ohata et al. | |
| 4,714,694 A | 12/1987 | Wan et al. | |
| 4,727,052 A | 2/1988 | Wan et al. | |
| 4,923,842 A | 5/1990 | Summers | |
| 5,202,300 A | 4/1993 | Funabiki et al. | |
| 6,586,254 B1 | 7/2003 | Kumar et al. | |
| 6,727,097 B2 | 4/2004 | Kumar et al. | |
| 2002/0034460 A1* | 3/2002 | Bruck et al. ................ 422/180 |
| 2003/0021745 A1* | 1/2003 | Chen ...................... 423/239.1 |
| 2003/0061860 A1 | 4/2003 | Hu et al. .................... 73/23.31 |

FOREIGN PATENT DOCUMENTS

| | | |
|---|---|---|
| EP | 0 161 743 A2 | 11/1985 |
| EP | 0 439 010 A2 | 7/1991 |
| JP | 55151109 | 11/1980 |
| JP | 56044411 | 4/1981 |
| JP | 59052530 | 3/1984 |
| JP | 60031828 | 2/1985 |
| JP | 61274746 | 4/1986 |
| JP | 63077544 | 4/1988 |
| JP | 63205141 | 8/1988 |
| WO | WO 02/083301 A2 | 10/2002 |

* cited by examiner

*Primary Examiner*—Walter D Griffin
*Assistant Examiner*—Lessanework Seifu
(74) *Attorney, Agent, or Firm*—Scott S. Servilla; Diehl Servilla LLC; Melanie L. Brown

(57) ABSTRACT

The present invention discloses novel catalysts for treating automobile exhaust that have increased resistance to poisoning from oil- and/or fuel-derived additives. In the catalysts of this invention, the catalytic materials are not coated onto a front-end poison capture zone of the support that carries the catalytic layers. Since poisonous elements tend to deposit on the upstream end of the catalyst, such poisons do not inactivate any of the catalytic materials.

15 Claims, 1 Drawing Sheet

HIGH PHOSPHOROUS POISONING RESISTANT CATALYSTS FOR TREATING AUTOMOBILE EXHAUST

FIELD OF THE INVENTION

The present invention relates generally to a system for minimizing the deleterious impact of oil-derived and/or gasoline additive compounds on automotive exhaust after treatment systems.

BACKGROUND OF THE INVENTION

Automotive emissions control is a mature industry. Automakers and suppliers have been challenged to control and reduce vehicle tailpipe emissions by the U.S. Clean Air Act in 1965 and subsequent legislation in other countries. Base engine emissions of controlled exhaust products have been reduced significantly over the past thirty years, as compliance with periodically decreasing tailpipe limits has been made possible through the use of catalytic converters.

A catalytic converter typically contains one or more catalytic elements, which lower hydrocarbons (HC), carbon monoxide (CO) and/or nitrogen oxides ($NO_x$). Some catalyst systems are also designed to reduce particulate matter from diesel engines.

The individual catalysts may be coated onto ceramic or metal spheres or on metal screens which act as particulate filters. Most often, however, the active catalyst components are coated onto a ceramic or metal honeycomb element termed a "monolith." Also included in this category are monoliths applied as diesel particulate filters (DPFs). The active catalyst components may be supplied either directly to the monolith, or more typically as a component of a "washcoat" which can be an aqueous slurry of particulate supports such as metal oxides that are impregnated with the active catalytic component. The applied washcoat can be calcined, or may be deposited on the monolith after the metal oxide-supported catalyst has been calcined. A single catalytic converter or multiple converters may be used. As many as four or five monoliths may be placed in succession in the exhaust stream depending on the particular application.

Emissions requirements have become increasingly stringent, requiring development of both new catalysts and higher catalyst loadings. In addition to absolute emissions standards, emissions control system longevity, i.e. "durability", requirements have also been extended. This maintenance of operation requirement over extended periods has also challenged catalyst development, and has required still further increased catalyst levels. It is primarily the catalyst loading levels, in particular, precious metal loading, which controls the cost of the catalytic converter. Converters that meet all the requirements with a minimum of precious metal loading is a primary objective of catalyst manufacturers.

Numerous reactions can occur during combustion of a hydrocarbon fuel in a variety of temperature and fuel/air stoichiometric environments and the products of such reactions can limit catalyst durability. For example, it was recognized quite early that lead, formerly supplied as an octane booster in fuel as tetraethyl lead, was a serious catalyst poison. The lead octane boosters, thus, have been removed from modern day fuels.

Other octane boosters added to non-leaded fuel, such as methylcyclopentadienyl manganese tricarbonyl (MMT), may result in manganese contained in the exhaust gas and which in excess amount, may coat, foul, or otherwise poison the catalytic layers. Thus, numerous trace elements still come into contact with the automotive exhaust catalysts, some unavoidably so, and several of these are known to decrease catalyst durability. Not all these poisonous trace elements are derived from the fuel.

For example, zinc dialkyldithiophosphates (ZDDPs) have been long used as antioxidants and/or high-pressure lubricant additives in motor oils. Especially with modern high-speed engines, increased piston/wall clearances and decreased sealing allow increased entry of oil into the combustion chamber, where oil additives, or their combustion byproducts, subsequently pass into the exhaust stream. Such catalytic poisoning is one of the primary obstacles to the durability of low emission catalyst systems. Trace amounts of zinc, phosphorus, calcium, and other elements are put in engine oil as anti-wear additives. The purpose of such additives is to protect engine parts from excessive wear during start-up, when engine oil is not coating the metal components of the engine. However, as the engine burns oil, zinc and phosphorus are exhausted through the catalytic converter, which may accelerate degradation of exhaust catalyst activity. Although the antiwear additives could be removed from the oil, long-term durability of the engine could suffer.

The use of engine anti-wear additives, such as phosphorous and zinc, is described in many references. These additives include compounds such as ZDDPs, also referred to as zinc dithiophosphates (ZDTPs), and zinc dithiocarbamates (ZDTCs). Other disclosed zinc and phosphorous additives to oil include metallic detergents included as extreme pressure agents. Reference is made to U.S. Pat. Nos. 4,674,447 and 5,696,065. The phosphorous and zinc are disclosed as lowering the function of the motor vehicle exhaust treatment catalyst.

Automotive oil additives, such as ZDDP, form an antiwear coating on engine components and act as an antioxidant in the oil. Although engines are designed to minimize the quantity of engine oil exiting the engine via the combustion chamber and exhaust system, it is inevitable that a small fraction of engine oil is released by this mechanism. The ZDDP additive of engine oil deleteriously affects catalytic converters due to phosphorus from the ZDDP interfering with active sites within the catalyst. These phosphorus containing species deposit onto, or react with washcoat components, such as aluminum oxide and cerium oxide, and remain there indefinitely. This phenomenon is commonly referred to as "phosphorus poisoning."

This poisoning mechanism is quite complex, and highly dependent upon the operating temperature, the oil consumption of the engine, and the source of the oil consumption. For example, when oil leaks past the piston rings, and washes into the combustion chamber, the oil goes through the combustion process. This will result in certain types of phosphorus and/or zinc compounds (among other contaminants). Particular compounds may have a particular deactivation effect on the catalytic converter, depending upon the operating condition. On the other hand, oil that leaks past the exhaust valve guide and stem, may not go through the combustion process, and result in a different type of poisoning of the catalytic converter, namely, forming a glaze layer covering the catalytic layers.

Measures to eliminate or reduce ZDDP in engine oils have been investigated. Alternatives to ZDDP have been produced which have been shown to provide antioxidant and antiwear properties similar to ZDDP. However, the ZDDP alternatives are cost prohibitive. Engine oils may be formulated with a lesser amount of ZDDP with the consequences that engine wear and oil oxidation increase, the former limiting engine life and the latter reducing useful oil life.

It is well known in the art to utilize catalyst compositions to treat gaseous streams such as the exhaust gases of internal combustion engines. It is also well known that sulfur oxides ($SO_x$) and phosphorous oxides ($PO_x$) tend to poison, i.e., deactivate many catalysts used for such treatment. $SO_x$ is a particular problem inasmuch as it is generated by the oxidation of sulfur compound impurities often found in gasoline and diesel fuel. $PO_x$ is often generated from phosphorous compounds in engine lubricating oils. It is known in the art to place a guard (e.g., alumina) or filter ahead of a catalyst to attempt to protect the catalyst from $SO_x$ and/or $PO_x$. However, difficulties are encountered when the guard or filter becomes saturated with $SO_x$ and/or $PO_x$.

It was proposed in Japanese applications JP 55 151109 and JP 56 044411, to insert an alumina-containing phosphorus trap in the oil recirculation system to remove suspect components from the oil being recirculated, and thus protect the exhaust catalyst. However, such systems are inefficient in the degree of protection achieved, may become rapidly fouled, and may remove desirable antioxidant from the oil.

It is known in the prior art to use combinations of sorbents and catalysts to reduce catalytic poisoning. This is shown, for example, at pages 45-48 of the publication Environmental Catalysis For A Better World And Life, Proceedings of the 1st World Congress at Pisa, Italy, May 1-5, 1995, published by the Societa Chimica Italiana of Rome, Italy, in an article entitled "The New Concept 3-Way Catalyst For Automotive Lean-Burn Engine Storage and Reduction Catalyst", by Takahashi et al. This article deals with $NO_x$ abatement in lean $NO_x$ gases and shows materials comprising precious metals, mainly platinum, and various alkaline and alkaline earth metal oxides, mainly barium oxide and rare earth metal oxides, disposed on supports such as alumina. At page 47 of the article, there is disclosed the concept of employing $NO_x$ storage compounds and catalytic components dispersed on a common support material.

U.S. Pat. No. 5,202,300, "Catalyst For Purification of Exhaust Gas", issued on Apr. 13, 1993, to M. Funabiki et al, discloses a catalyst composition comprising a refractory support having deposited thereon an active layer containing a palladium and rhodium catalytic metal component dispersed on alumina, a cerium compound, a strontium compound and a zirconium compound.

U.S. Pat. Nos. 4,714,694, 4,727,052, and 4,708,946 disclose the use of bulk cerium oxide (ceria) to provide a refractory oxide support for platinum group metals other than rhodium. Highly dispersed, small crystallites of platinum on the ceria particles may be formed and stabilized by impregnation with a solution of an aluminum compound followed by calcination.

Japanese Patent Publication No. 52530/1984 discloses a catalyst having a first porous carrier layer composed of an inorganic substrate and a heat-resistant noble metal-type catalyst deposited on the surface of the substrate and a second heat-resistant non-porous granular carrier layer having deposited thereon a noble metal-type catalyst. The second carrier layer is formed on the surface of the first carrier layer and has resistance to the catalyst poison.

Japanese Patent Publication No. 31828/1985 discloses a catalyst for purifying exhaust gases comprising a honeycomb carrier and a noble metal having a catalytic action for purifying exhaust gases. The carrier is coated with two slurries containing different kinds of alumina powder. Subsequently, the alumina-coated honeycomb is immersed in a noble metal solution.

Japanese Patent J-63-205141-A discloses a layered automotive catalyst in which the bottom layer comprises platinum or platinum and rhodium dispersed on an alumina support containing rare earth oxides, and a topcoat, which comprises palladium and rhodium dispersed on a support comprising alumina, zirconia and rare earth oxides.

Japanese Patent J-63-077544-A discloses a layered automotive catalyst having a first layer comprising palladium dispersed on a support comprising alumina, lanthana and other rare earth oxides and a second coat comprising rhodium dispersed on a support comprising alumina, zirconia, lanthana and rare earth oxides.

U.S. Pat. No. 4,587,231 discloses a method of producing a monolithic three-way catalyst for the purification of exhaust gases. A mixed oxide coating is applied to a monolithic carrier by treating the carrier with a coating slip in which an active alumina powder containing cerium oxide is dispersed together with a ceria powder and then baking the treated carrier. Platinum, rhodium and/or palladium are then deposited on the oxide coating by a thermal decomposition. Optionally, a zirconia powder may be added to the coating slip.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The layer of catalyst is separate from the lanthanum oxide. The noble metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc.

Engine technology and exhaust gas treatment technology have reduced the level of lubricating oil, including phosphorous and zinc compounds, passed by engines to the exhaust treatment catalysts, and the catalysts have been sufficiently active to treat exhaust gases in accordance with various government regulations. However, as engine performance continues to increase and environmental regulations become more stringent, exhaust catalyst activity will have to be increased and maintained with longer engine life, for example, 150,000 miles. It is common also that the oil consumed by an engine increases as the mileage increases (e.g., >100,000 miles). Accordingly, there will be a greater build up of compounds, particularly phosphorous and/or zinc compounds and others, passing to the emission treatment catalyst from the engine. Low emission vehicles could benefit from exhaust after treatment systems with a tolerance for engine oil or fuel additive poisons.

It is desirable to have a poisoning resistant catalyst that maintains its functionality as both engine performance and lifespan increase. It would be desirable to provide a means whereby catalyst poisons, which lower emission catalyst durability, can be effectively removed or sufficiently tolerated without requiring increased precious metal catalyst loading to compensate for reduced catalyst activity.

SUMMARY OF THE INVENTION

The present invention provides for novel poisoning-resistant catalysts used for automobile exhaust treatment. To alleviate the detrimental affects of engine oil and/or fuel additive poisoning that occurs predominantly at the front end of the catalyst, in the catalysts of this invention, catalytic materials, in particular, high cost precious metal components, are not washcoated onto a front end poison capture zone of the catalyst support structure. The poison capture zone is the inlet or at least upstream 0.5 centimeter of the catalytic substrate.

Therefore, phosphorous as well as other poisoning deposits, which tend to accumulate in the poison capture zone on the extreme upstream end of the catalyst support structure, do not block or deactivate any catalytic materials.

DETAILED DESCRIPTION OF THE INVENTION

Figure 1:
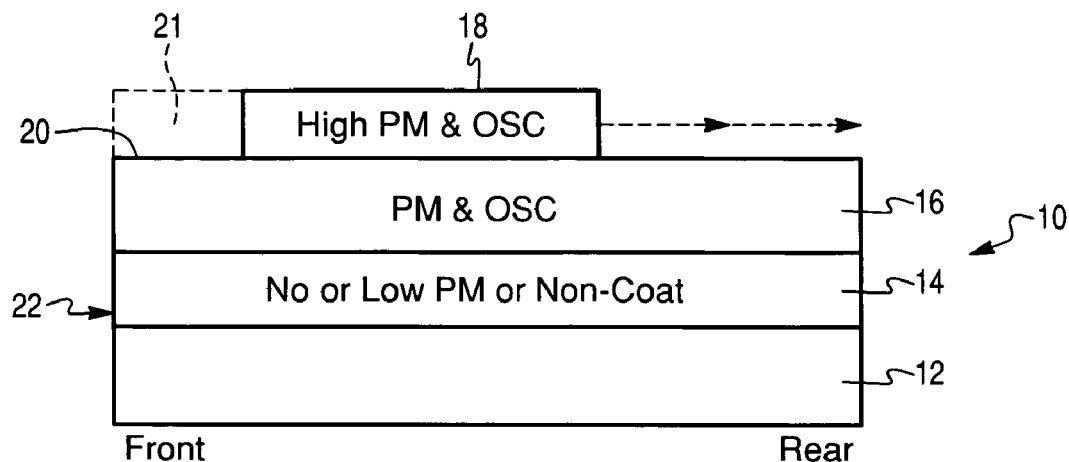
FIG. 1 is a schematic view showing a configuration of layers on an exhaust gas purifying catalyst resistant to poisoning according to an embodiment of the present invention.

The catalytic configurations of the present invention can be employed to promote chemical reactions, such as reductions of nitrous oxides, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalysts of this invention can be used to provide removal from gaseous exhaust effluents of uncombusted or partially combusted carbonaceous fuel components such as carbon monoxide, hydrocarbons, and intermediate oxidation products primarily composed of carbon, hydrogen and oxygen, or nitrogen oxides.

Although some oxidation or reduction reactions may occur at relatively low temperatures, often such reactions are conducted at elevated temperatures of, for instance, at least about 150° C., preferably about 200° to 900° C., and generally with the feedstock in the vapor phase. The materials that are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials are present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air, e.g., by air pump, or other desired form having a greater or lesser oxygen concentration. The products from the oxidation contain a greater weight ratio of oxygen to carbon than in the feed material subjected to oxidation. Many such reaction systems are known in the art.

Automotive exhaust gas catalyst compositions are typically coated onto a suitable heat- and chemical-resistant substrate. The catalyst coating composition, when applied to the substrate in a slurry or liquid form, is referred to as a washcoat. Such automotive catalytic systems are susceptible to poisoning due to lubricant oil- or fuel additive-derived phosphorus, zinc, calcium, manganese, sulfur and other compounds. The poisons may accumulate on the surface of the washcoat, creating a physical diffusion barrier, or they may interact with the catalytic material in the washcoat, resulting in loss of catalytic activity, and/or become a barrier to particulate filters such as foam, screens and wallflow filters. The poison level and type can vary, depending upon the design of the engine and the operating conditions and location of catalyst. In the development of the emission control system, it is critical to know the type of poison exposure and the impact of poison on the emissions control system in general, and the catalytic converter, in particular.

Known three-way conversion (TWC) catalysts, which exhibit good activity and long life, comprise one or more platinum group metals (e.g., platinum or palladium, rhodium, ruthenium and iridium) located upon a high surface area refractory oxide support, e.g., a high surface area alumina coating. The support is carried on a suitable carrier or substrate such as a monolithic substrate comprising a refractory ceramic or metal honeycomb structure, or refractory particles such as spheres or short, extruded segments of a suitable refractory material.

The catalysts of the present invention include a non-precious metal containing poison capture zone, which serves to alleviate the deleterious effects of poisonous deposits. The poison capture zone is defined as the inlet or upstream at least 0.5 cm of the catalyst substrate. Poison capture zones generally will comprise the upstream 0.5 to 5.0 cm of the catalyst substrate. The poison capture zone is substantially devoid of precious metal catalyst components. The poison capture zone can comprise an uncoated upstream edge of the support or a coating, which does not contain an effective amount of a precious metal. Preferably, the poison capture zone is porous so as to more effectively trap the inorganic poisons. Poison capture zones having lengths of 1.0 to 3.5 cm and 1.5 to 2.5 cm from the upstream edge of the catalyst substrate are also exemplified. Gas entry into the catalytic converter produces a turbulent zone in the upstream region of the catalytic converter, typically within the first 1.5 centimeters, e.g., as a function of hydraulic diameter Dh defined by cross-section area divided by perimeter of the cell. Catalytic poisons (P, Mn, Zn, Ca, etc.) predominantly deposit within the first 2.5 centimeters of the catalytic converter. The present invention describes a new catalyst design that avoids coating the upstream poison capture zone with precious metal components. Deposited poisons, therefore, fail to foul, block, or deactivate the valuable catalytic material. As a result of providing greater catalytic durability and lifespan, use of over-designed amounts of expensive catalytic materials to accommodate poison fouling after long-term aging, can be avoided.

The length of the poison capture zone, that being the length of the catalyst substrate surface which is uncoated with precious metals can also be described as a percentage of the length of the catalyst substrate from the upstream to downstream edge. Typically, the poison capture zone will comprise from 3 to about 70% of the length of the catalyst substrate. Also exemplified are poison capture zones comprising 10 to 60% and from 20 to 50% of the length of the catalyst substrate. Poison capture zones of up to 30% of the length of the catalyst substrate are also exemplified.

In general, the exhaust gas treatment catalysts of the present invention are formed by the application of at least two washcoats, typically a base coat devoid of precious metal and a precious metal-containing topcoat to a support structure such as a honeycomb monolith. First, the base coat is applied to the entirety of the support structure. The base coat may contain components which interact with S-, P-, and/or Mn-containing species to trap and maintain these poisons in the base coat region. Examples of such components include alumina, barium, calcium, strontium, magnesium, and/or cerium oxide. Next, the poison capture zone or upstream portion of the base coat is pre-wet with water, alumina slurry or another liquid lacking a precious metal component. Subsequently, at least one topcoat, comprising a precious metal component and usually an oxygen storage component, is applied to the base coat. Pre-wetting the poison capture zone of the base coat, i.e., saturating the porous base coat and substrate with water, and adjusting the solid/water content of the top coat inhibits subsequent catalytic washcoats from binding to the poison capture zone, and, accordingly, the upstream end, about 0.5 to 5.0 cm from the upstream edge of the substrate, is devoid of precious metal. The coating process can be manipulated such that the precious metal-containing top coat is applied as a washcoat over only a fraction of the base coat, excluding the poison capture zone. The majority of the deleterious deposits typically accumulate within the poison capture zone. Without interference from traditional catalytic poisoning within the poison capture zone, the overall catalytic activity and thus the long-term durability of the precious metal components are enhanced. Inversely, an increase in aged catalytic activity and durability allows for a decrease in the necessary amounts of expensive precious metals within the catalytic system.

The precious metal component comprises one or more precious metals selected from the group consisting of gold, silver and platinum group metals. The catalyst of this invention comprises at least one precious metal component in an amount sufficient to provide compositions having significantly enhanced catalytic activity to oxidize hydrocarbons and carbon monoxide and reduce nitrogen oxides. As used herein, the term "precious metal components" include gold, silver and "platinum group metal component" including platinum, palladium, osmium, rhodium, ruthenium and iridium components and means any such platinum group metal compound, complex, or the like which, upon calcination or use of the catalyst decomposes or otherwise converts to a catalytically active form, usually, the metal or the metal oxide.

The precious metal component, such as a platinum group metal catalytic component, can be a suitable compound, and/or complex of any of the platinum group metals to achieve dispersion of the catalytic component on a support, preferably activated alumina and/or ceria-zirconia composite support particles. Water soluble compounds or water dispersible compounds or complexes of one or more platinum group metal components may be utilized as long as the liquid used to impregnate or deposit the catalytic metal compounds onto the support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation.

Generally, both from the point of view of economics and environmental aspects, aqueous solutions of soluble compounds or complexes of the platinum group metals are preferred. For example, suitable compounds are chloroplatinic acid, amine solubilized hydroxide complexes of platinum, rhodium chloride, rhodium nitrate, hexamine rhodium chloride, palladium nitrate or palladium chloride, etc. During the calcination step, or at least during the initial phase of use of the catalyst, such compounds are converted into a catalytically active form of the platinum group metal or a compound thereof, typically an oxide and fixed onto the substrate.

The method of fixing the precious metal component can comprise chemically fixing the precious metal component on the refractory oxide support or, alternatively, the step of fixing can comprise thermally treating the precious metal component. The step of fixing comprises calcining the precious metal component on the refractory oxide support. The step of calcining can be conducted at from 180° C., preferably 200° C. to 900° C. at from 0.2 to 10 hours. The steps of thermally fixing each layer can be conducted after coating and prior to coating a subsequent layer. Alternatively, the step of thermally treating the substrate can take place upon completion of coating all layers. Such treatment can be from 180° C. to 400° C. at from 10 to 60 seconds. The steps of calcining are preferably conducted upon completion of coating all layers. The step of calcining is conducted at from 200° C. to 900° C. at from 0.2 to 10 hours.

Typically, one or more of the precious metal-containing top coats will comprise an oxygen storage component. The oxygen storage component will comprise one or more reducible oxides of one or more rare earth metals. Preferred examples of suitable oxygen storage components include ceria, a mixed oxide of cerium and zirconium and a mixed oxide of cerium, zirconium, praseodymium, lanthanum, and neodymium. The oxygen storage component is preferably in composite or bulk form. By composite or bulk form it is meant that the oxygen storage composition is present as discrete but uniform crystallite particles, which may be as small as 0.1 to 15 micrometers in diameter or smaller, as opposed to having been dissolved in solution with the support precious metal. Bulk cerium oxide (ceria) is disclosed to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694 of C. Z. Wan et al, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan et al and in U.S. Pat. No. 4,708,946 of Ohata et al.

The oxygen storage component composition may comprise an oxygen storage component, ceria and a diluent component preferably zirconia. Optionally, the oxygen storage composition may further comprise neodymium and praseodymium components. These are believed to promote structural stability and/or chemical activity. The praseodymium additionally is believed to act as an oxygen storage component. The diluent component can be any suitable filler, which is inert to interaction with platinum group metal components so as not to adversely affect the catalytic activity of such components. A useful diluent material is a refractory oxide with preferred refractory oxides being of the same type of materials recited below for use as catalyst supports. The oxygen storage composition is therefore stabilized against deactivating when used in high temperature environments such as temperatures of from 550° C. to 1100° C.

A preferred oxygen storage composition in the specific composition comprises the ceria-zirconia composite additionally containing neodymia, praseodymia, lanthana, and other rare earth oxides. The zirconium, rare earth composition recited above is in particulate form to permit the ceria, neodymia, praseodymia and zirconia to be in proximity to each other. It is believed that particles containing these components benefit by their interaction. So long as this proximity of components is maintained the composition can be added to the catalyst composition in any form, preferably composite or bulk (particulate) form.

FIG. 1 depicts a configuration of an exhaust gas purifying catalyst of the present invention and that is resistant, for example, to oil-derived poisons. In this embodiment of the present invention, the catalyst indicated in general by reference numeral 10 includes a honeycomb substrate 12, a base coat 14, and two precious metal-containing layers 16 and 18, of which only layer 18 incorporates a poison capture zone 20. In this embodiment of the invention, base coat layer 14 is placed upon the entirety of substrate 12. Base coat 14 is typically a refractory metal oxide such as alumina, silica, titania, zirconia, silica-alumina, alkaline earth oxides such as barium or strontium oxides, rare earth oxides such as lanthanum or cerium oxide, and may contain no precious metals, low amounts of precious metals, or may be completely omitted. In general, the base coat will contain less than 5.0 g/ft$^3$ of precious metal and, more particularly, from about 0.5 to 2.0 g/ft$^3$. A first catalytic layer 16 is added over the entirety of the base coat 14 or bare substrate 12. The first catalytic layer 16 contains a precious metal component impregnated onto a refractory oxide support and an oxygen storage component. Second catalytic layer 18, the same or similar to the first catalytic layer, is applied onto the first catalytic layer 16 and incorporates a poison capture zone 20. The poison capture zone is a non precious metal-containing upstream edge of catalyst 10. As shown, the poison capture zone 20 is a non-coated portion of the underlying layer. Alternatively the poison capture zone can comprise a coating 21 which does not contain any effective catalytic levels of precious metal. The coating 21 can comprise a refractory or rare earth oxide, for example. The non-coated portion 20 or coating 21 comprises a length of from about 0.5 to 5.0 cm from the upstream edge 22 of catalyst 10. The second catalytic layer 18 may cover either a fraction or the entirety of the first catalytic layer 16, excluding the poison capture zone 20. The second catalytic layer 18 contains high levels of a precious metal component and typically will contain an oxygen storage component. The precious metal- and OSC-containing layers will generally contain a precious metal loading of from about 5 to 500 g/ft$^3$. Loadings of precious metal from 20 to 150 g/ft$^3$ and 50 to 100 g/ft$^3$ are also exemplified. OSC levels of from 0 to 2.5 g/in$^3$ and 0.2 to 1.0 g/in$^3$ are exemplified.

Figure 2:
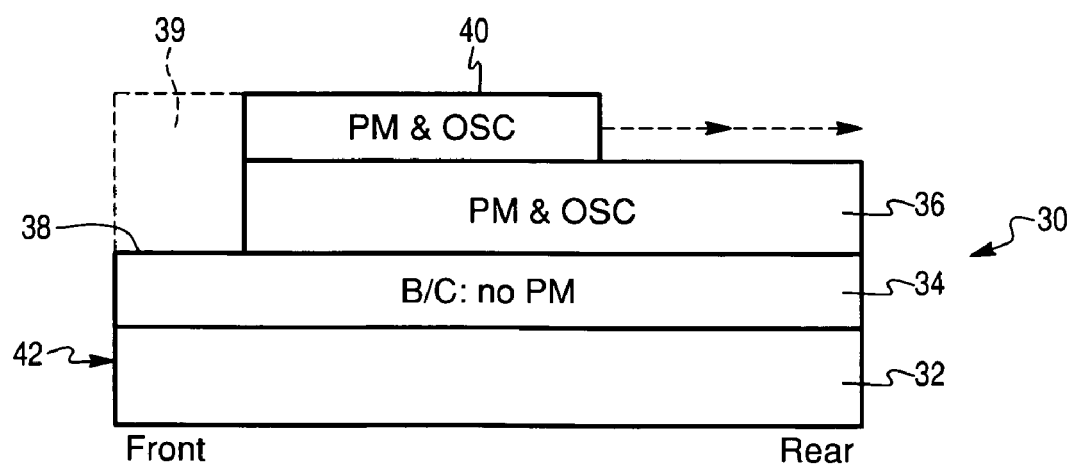
FIG. 2 is a schematic view showing another configuration of layers on an exhaust gas purifying catalyst resistant to poisoning according to an embodiment of the present invention.

FIG. 2 depicts an alternative configuration of an exhaust gas purifying catalyst resistant to poisoning of the present invention. In FIG. 2, the catalyst is indicated by reference numeral 30. In this embodiment of the present invention, catalyst 30 contains a substrate 32, such as a honeycomb monolith, and three layers coated thereon, with two layers incorporating a poison capture zone. A base coat layer 34 is placed over the entirety of the substrate 32 and generally comprises a refractory oxide such as alumina which is devoid of a precious metal component. A first catalytic layer 36 incorporates an uncoated poison capture zone 38 along the base coat layer 34. The first catalytic layer 36 covers the entirety of the base coat layer 34, excluding the poison capture zone 38. The first catalytic layer 36 contains a precious metal component and an oxygen storage component. A second catalytic layer 40 incorporating a poison capture zone 38 is added onto the first catalytic layer 36. The second catalytic layer 40 may cover either a fraction or the entirety of the first catalytic layer 36, excluding the poison capture zone 38. The second catalytic layer 40 contains a precious metal component and an oxygen storage component. Levels of the precious metals and oxygen storage component are the same as described for FIG. 1. The length of the poison capture zone 38 from the leading edge 42 of catalyst 30 is also the same as described for FIG. 1. Again as in FIG. 1, the poison capture zone can comprise a non-precious metal containing coating 39 such as a refractory or rare earth metal oxide.

The addition of further layers and different layer configurations are well within the scope and spirit of the present invention. Any layer that includes a precious metal can be provided with a poison capture zone as discussed above. The experimental Examples expressly disclosed are only a few of the many possible embodiments of the present invention.

Example

In this example, a catalyst like that shown in FIG. 1 is formed.

A first poison capture layer was formed on a ceramic honeycomb. 92.8 parts of gamma-alumina was combined with 7.3 parts of alumina-based binder, 2.9 parts of zirconia based binder, 562 parts DI-water, and 70 parts of 90% concentrated acetic acid to make a slurry of 40% solids content before proceeding to milling. Milling was conducted until the particle size distribution showed that 90% of particles became less than 10 microns.

After milling, the slurry was coated onto a ceramic honeycomb with 900 cells per square inch (cpsi) and with a wall thickness of 2.5 mils. The coating was performed by dipping the honeycomb substrate into the slurry, draining the slurry, and subsequently by blowing off the excessive slurry with compressed air. The coated honeycomb was dried at 110° C. for 4 hrs. and calcined at 550° C. for 2 hrs.

A middle layer was then formed by the following procedure. In a planetary mixer, 0.9 part of Rh was introduced into a mixture of two stabilized Ce—Zr compounds. One compound comprised 78.1 parts of a 30% CeO2-containing Ce—Zr composite and the other component was 17.3 parts of a 5% CeO2-containing Ce—Zr composite. Rh was diluted in a volume of aqueous solution just enough to fill all of the pores. The Rh-containing Ce—Zr composites were added to a solution containing sufficient DI-water and 4 parts of acetic acid, and milled to a particle size distribution wherein 90% of the particles were less than 9 microns. After milling, 0.9 parts of zirconia binder and 2.8 parts of alumina binder were added to the Rh-containing slurry and shear mixed together for a minimum of 10 minutes.

The final Rh-slurry was adjusted to a 37% solids content by adding 6.5 parts of water, and coated onto the ceramic honeycomb on to which the poison-capture first layer mentioned above was already coated. The coated honeycomb was dried at 110° C. for 4 hrs., followed by calcination at 430° C. for 2 hrs. All calculations were based on metal oxide basis except precious metals, which were based on metal weight basis.

A precious metal-containing top layer was then formed. In a planetary mixer, 87 parts of stabilized gamma-alumina was impregnated with 4.14 parts of Pd. Pd was introduced as a conventional Pd aqueous solution with the dilution reaching the incipient wetness of the alumina. The Pd-containing alumina powder was combined with 7.2 parts of $Sr(OH)_2$, 2.9 parts of zirconium hydroxide, and sufficient DI-water, and mixed well for 10 minutes. The mixture was acidified by at least 6 parts of acid to provide a slurry pH<5 and a 42% solids content before proceeding to milling. Milling was conducted until the particle size distribution showed that 90% of particles become less than 10 microns.

Before coating the milled Pd-containing slurry onto the ceramic honeycomb already coated with poison-capture first layer, and Rh-containing second layer, the inlet portion of the coated honeycomb substrate was pre-wetted with 16 parts of water sufficient to saturate the pores of the previous two coats for 10 mm from the leading edge of the substrate toward the substrate center. A test piece is recommended at this stage to test "the water absorption capacity" per axial length before finalizing the desirable pre-wet zone length.

In this example, 10 mm was selected as the poison capture zone length. After wetting the front 10 mm, the milled Pd-containing slurry was metered from the pre-wetted side (inlet) and forced into the coated substrate immediately by compressed air or air knife. The solids content of the slurry will determine how far the slurry will travel and cover the coated substrate in the axial direction. In this case, a 37% solids content slurry traveled 37.5 mm of axial length. In the case of a low solids content, the slurry will cover the whole axial length and excessive amount of slurry can be blown off the substrate. Once the coated channels in the substrate were cleared, the coated honeycomb was dried at 110° C. for at least 4 hrs. and calcined at 550° C. for at least 2 hrs.

What is claimed is:

1. An automobile exhaust gas treatment catalyst having increased resistance to poisoning from oil- and/or fuel-derived additives, comprising:
   a substrate having an upstream edge in initial contact with exhaust gas;
   optionally, a base coat coating said substrate, said base coat being devoid of precious metal or containing a low level of precious metal;
   a precious metal-containing first catalytic layer placed on said base coat or said substrate, said first catalytic layer having a higher level of precious metal than said base coat;
   at least one precious metal-containing further catalytic layer placed on said first layer, the at least one further catalytic layer containing a higher concentration of precious metal than the first catalytic layer;
   wherein only said at least one further catalytic layer contains a non-precious metal-containing poison capture zone, wherein said poison capture zone comprises an uncoated portion upstream of said at least one further catalytic layer, and said poison capture zone comprising a length of from about 0.5-5 cm from said upstream edge.

2. The catalyst of claim 1 wherein said base coat is present and contains a concentration of precious metals of from 0 to less than 5.0 g/ft$^3$.

3. The catalyst of claim 2 wherein said base coat contains phosphorus and/or sulfur trapping materials selected from Ba, Sr, Ca, Mg, La, Ce, Pr and Na.

4. The catalyst of claim 1 wherein said first catalytic layer and said at least one further catalytic layer comprise a precious metal component and an oxygen storage component.

5. The catalyst of claim 1 wherein said precious metal component is selected from the group consisting of ruthenium, rhodium, palladium, silver, osmium, iridium, platinum and gold.

6. The catalyst of claim 4 wherein said oxygen storage component is a reducible oxide of one or more rare earth metals.

7. The catalyst of claim 6 wherein said oxygen storage component is elected from the group consisting of ceria, a mixed oxide of cerium and zirconium and a mixed oxide of cerium, zirconium, praseodymium, neodymium, and/or stabilizer of lanthanum or yttrium oxide.

8. The catalyst of claim 1 wherein said catalytic layers comprise at least one precious metal carried on a refractory oxide support.

9. The catalyst of claim 1 wherein said substrate is a honeycomb monolith.

10. An automobile exhaust gas treatment catalyst having increased resistance to poisoning from oil- and/or fuel-derived additives, comprising:
    a substrate having an upstream edge in initial contact with exhaust gas and a downstream edge, the length of the substrate being measured from said upstream edge to said downstream edge;
    optionally, a base coat coating said substrate, said base coat being devoid of precious metal or containing a low level of precious metal;
    a precious metal-containing first catalytic layer placed on said base coat or said substrate, said first catalytic layer having a higher level of precious metal than said base coat;
    at least one precious metal-containing further catalytic layer placed on said first layer, the at least one further catalytic layer containing a higher concentration of precious metal than the first catalytic layer;
    wherein only at least one further catalytic layer contains non-precious metal-containing poison capture zone, wherein said poison capture zone comprises an uncoated portion upstream of said at least one further catalytic layer, and said poison capture zone comprising a length of from about 3 to 70% of the length of said substrate from said upstream edge.

11. The catalyst of claim 10 wherein said poison capture zone comprises a length ranging from 10 to 60% of the length of said substrate from said upstream edge.

12. A method of treating an automobile exhaust gas comprising contacting an exhaust gas stream with a catalyst having increased resistance to poisoning from oil- and/or fuel-derived additives, said catalyst comprising:
    a substrate having an upstream edge in initial contact with exhaust gas;
    optionally, a base coat coating said substrate, said base coat being devoid of precious metal or containing a low level of precious metal;
    a precious metal-containing first catalytic layer placed on said base coat or said substrate, said first catalytic layer having a higher level of precious metal than said base coat;
    at least one precious metal-containing further catalytic layer placed on said first layer, the at least one further catalytic layer containing a higher concentration of precious metal than the first catalytic layer;
    wherein only said at least one further catalytic layer contains a non-precious metal-containing poison capture zone, wherein said poison capture zone comprises an uncoated portion upstream of said at least one further catalytic layer, and said poison capture zone comprising a length of from about 0.5-5 cm from said upstream edge.

13. The method of claim 12 wherein said base coat is present and does not contain any concentration of precious metals.

14. The method of claim 12 wherein said first catalytic layer and said at least one further catalytic layer comprise a precious metal component and an oxygen storage component.

15. The method of claim 12 wherein said substrate is a honeycomb monolith.

* * * * *